May 27, 1930.  A. I. RISSER  1,760,441
CORK FEEDING DEVICE
Filed May 28, 1928   2 Sheets-Sheet 1
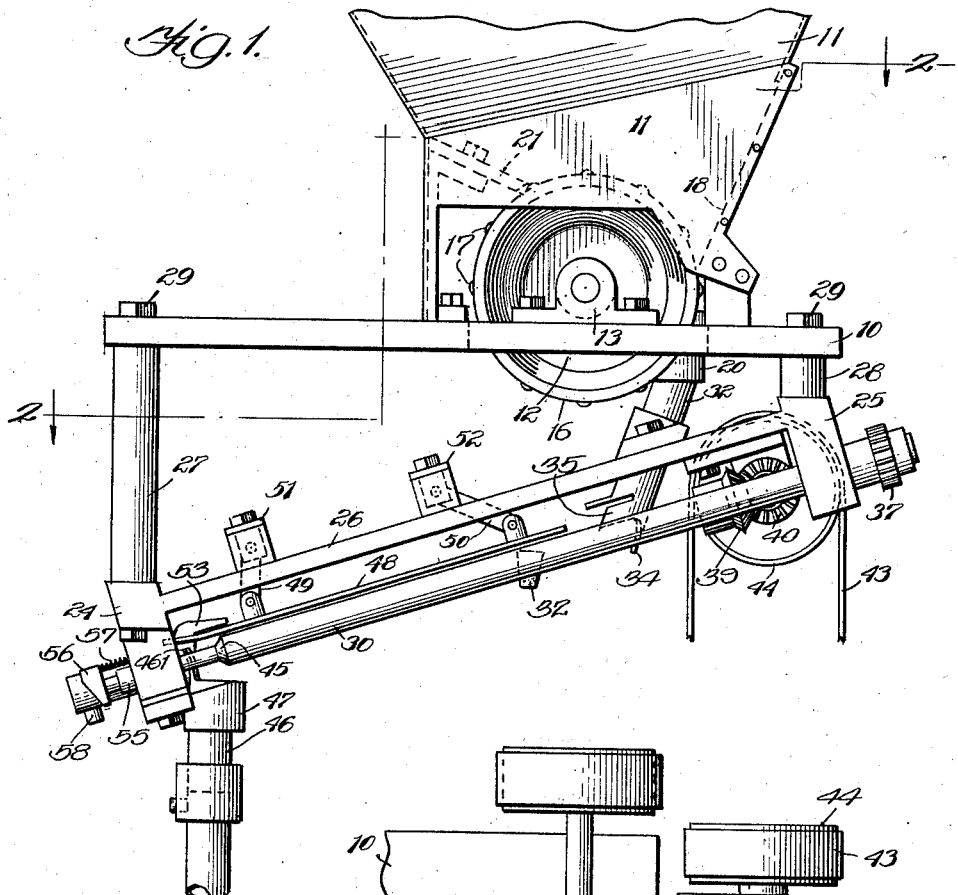
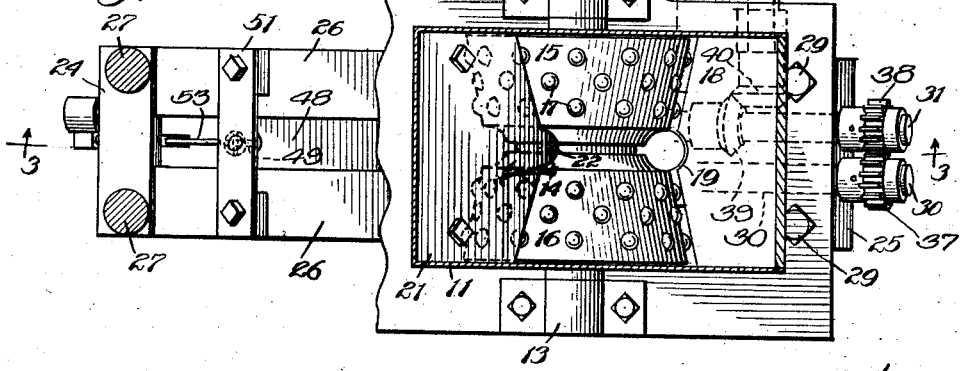

May 27, 1930. A. I. RISSER 1,760,441
CORK FEEDING DEVICE
Filed May 28, 1928 2 Sheets-Sheet 2
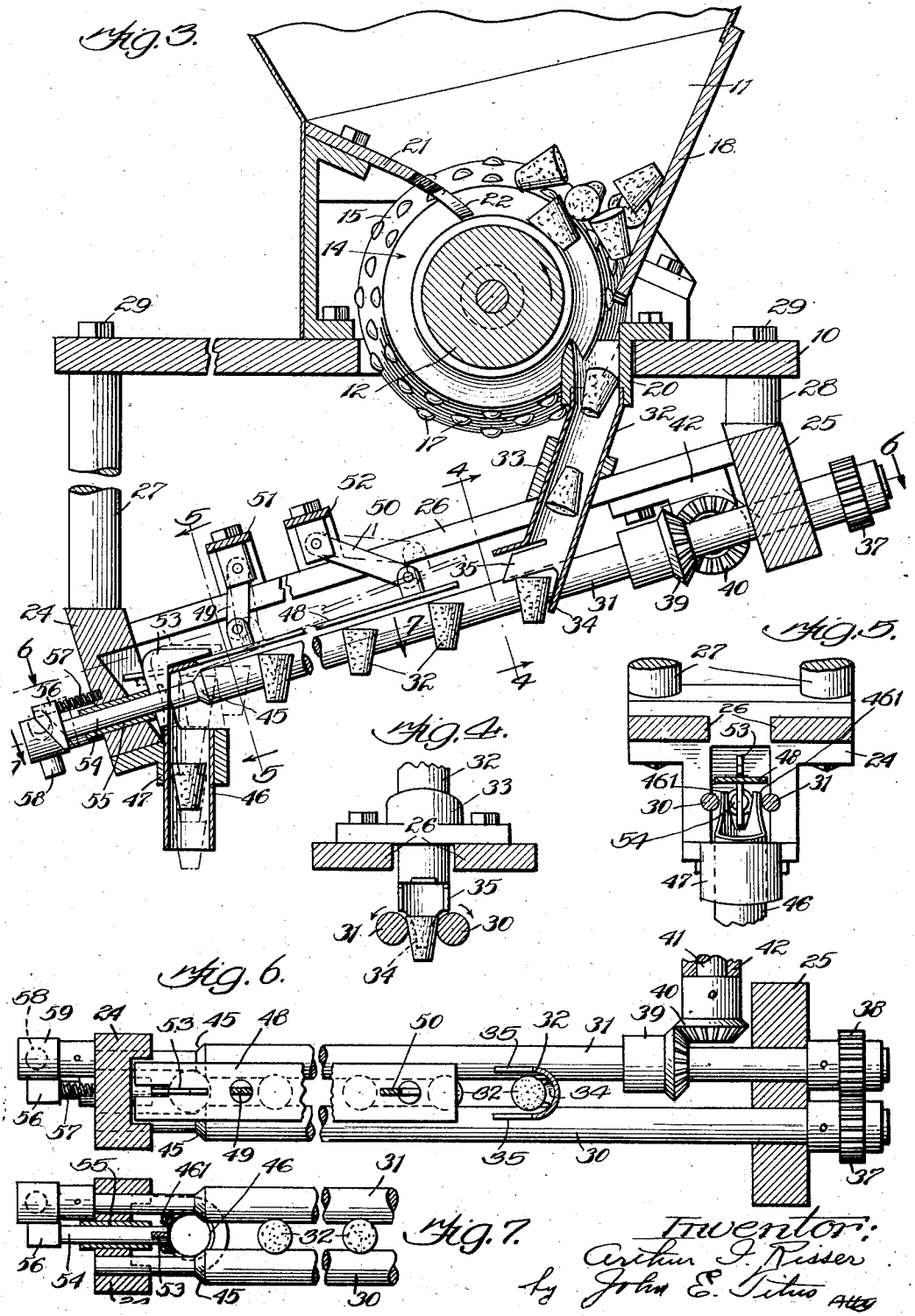

Patented May 27, 1930

1,760,441

UNITED STATES PATENT OFFICE

ARTHUR I. RISSER, OF CHICAGO, ILLINOIS, ASSIGNOR TO U. S. BOTTLERS MACHINERY CO., OF CHICAGO, ILLINOIS, A CORPORATION OF ILLINOIS

CORK-FEEDING DEVICE

Application filed May 28, 1928. Serial No. 281,345.

This invention relates to improvements in feeding mechanism, more especially for feeding corks and like objects which are commonly in the shape of a truncated cone, or in shapes which are larger at one end than at the other.

An object of this invention is to provide means for feeding the corks in regular order and positional coordination, so that the corks may be selected singly, as from a hopper, then righted so that the ends lie in the same direction, and fed in the same predetermined positional arrangement for any desired purpose, as for furnishing the corks to the mechanism of a bottle capping machine, or filling the cork supply magazines.

Other objects are to provide a simple and reliable means for righting the corks and feeding them in sequence at a substantially uniform rate; to provide suitable means for preventing the corks from becoming disarranged in the feeding mechanism; and to provide suitable holding back or retarding means for preventing the feeding mechanism from becoming clogged, especially in case the outlet port or passage becomes filled as when the corks are being fed faster than they are being used.

Other objects are to provide such a device which is simple in construction, substantially positive in action, and which will handle such objects as corks without damaging the same; and to provide such a device which will feed the corks uniformly at a high rate.

Other objects and advantages will become more apparent from the following description with reference to the accompanying drawing, in which:

Fig. 1 is a side elevation of one form of a cork feeder embodying my invention.

Fig. 2 is a plan section of the same taken substantially on the line 2—2 of Fig. 1.

Fig. 3 is a sectional elevation taken on the line 3—3 of Fig. 2.

Fig. 4 is a detail section on the line 4—4 of Fig. 3.

Fig. 5 is a section on line 5—5 of Fig. 3.

Fig. 6 is taken substantially on the line 6—6 of Fig. 3.

Fig. 7 is a section on the line 7—7 of Fig. 3.

The parts of the feeder are supported on the plate 10, which is mounted in a stationary position as on a stand or attached to the machine with which the feeder is used. A hopper 11 is mounted on the upper side of the plate, and a drum 12 is rotatably mounted in bearings 13 which are bolted to the plate. The drum is located in the bottom of the hopper and the lower portion of the drum projects through a suitable aperture provided in the plate. The drum is provided with a semicircular sectioned circumferential groove 14 around its central portion, and the frusto-conical portions 15 and 16, at either side of the groove are tapered outwardly, and the surfaces of the cones are provided with a plurality of projections 17.

The lower edge of the rear wall 18, of the hopper 11, is shaped to conform closely to the surface of the drum 12, and is provided with a notch 19 which complements the groove 14 in the drum, thereby forming a circular outlet which is directly over a tubular guide member 20 which is secured to the plate 10.

In the bottom of the hopper and opposite the wall 18 is provided a plate 21 which slopes from the adjacent wall of the hopper towards the surface of the drum and conforms closely thereto at its lower edge, being provided with a tongue 22 which projects into the groove 14 and prevents the corks from escaping at that side of the drum. In operation the drum is rotated counter-clockwise, as viewed in Fig. 3. The corks are moved and stirred around in the bottom of the hopper and find their way singly into the groove and then fall out of the hopper, through the tube 20. The corks are thus selected and dropped from the mass in the hopper, one by one.

Below the plate 10 and directly underneath the hopper 11 and drum 12, is mounted a frame consisting of the end members 24 and 25 which are joined by the spaced bars 26. This frame is connected to lie in an inclined position to the plate 10 by means of the two pairs of posts 27 and 28 which are secured to the plate by the screws 29, the posts 28 being shorter than the posts 27, as shown.

Journaled at their ends in the frame portions 24 and 25, are provided two feed and position correcting shafts 30 and 31 which lie side by side and are spaced so as to catch the larger ends of the corks above the center of gravity of the same, as is more clearly shown in Fig. 4. The corks are directed from the tube 20 into the space between the shafts 30 and 31 by the sleeve 32 which is held in the bracket 33, which bracket is mounted on the bars 26. The upper end of the sleeve 32 connects into the tube 20, and the lower end of the sleeve may be provided with a tongue 34 projecting down between the shafts and wings 35, at either side, for guiding the corks into the trough formed by the shafts. The corks of course fall out of the hopper with either end up, but are righted and positioned correspondingly in their engagement with the feed shafts.

The feed shafts are geared together at their upper ends by the gears 37 and 38 which are pinned to the shafts 30 and 31 respectively; and the shaft 31 is provided with a bevel gear 39 which meshes with a mating bevel gear 40 which is mounted on the drive shaft 41. The shaft 41 is journaled in a bracket 42 which is mounted on the rear one of the bars 26, and the drive shaft is rotated by any suitable means, as by a belt 43 connected to a source of power, the belt 43 running over a pulley 44 which is keyed on the shaft 41.

The direction of rotation is such that the feed and position correcting shafts 30 and 31 turn in opposite directions so that the surfaces of either or both shafts move upwardly into contact with the sides of the cork.

Due to the angular relation of the corks and the feed shafts, the corks are thereby caused to travel along the shafts in a regular manner and are maintained in an upright position with the small end down.

At the lower ends the feed shafts are reduced in diameter to provide a discharging portion to allow the corks to drop through, the shoulders 45 at the reduced portions being preferably conical, as shown. Directly underneath the reduced portions of the shafts is provided a receiver consisting of a vertical tube 46 which is mounted in a bracket 47 secured to the lower end frame portion 24. The upper end of the tube 46 is provided with two fingers 461 which project up between the feed shafts for guiding the corks down into the tube.

The frame portion 24 is recessed to receive one end of the packer, which consists of a plate 48, which is movably mounted over the space between the feed shafts. The plate 48 is pivotally connected to the lower ends of two links 49 and 50 which are of unequal lengths. The links are pivoted at their upper ends to the brackets 51 and 52, respectively, which are secured to and extend across the bars 26. At the lower end, the plate 48 is bifurcated to receive the upper end of the finger 53 which is mounted on the plunger shaft 54.

The plunger shaft 54 is slidably mounted in a bushing 55 which extends through and is secured in the frame portion 24, and which is located intermediate the shafts 30 and 31. On the outer end, the plunger shaft is provided with a cam block 56; and a spring 57, inserted between the block and the adjacent portion of the frame 24, urges the plunger outwardly so that the finger 53 abuts against the inner end of the bushing. At each revolution of the shaft 31, the plunger is moved forwardly up in between the feed shafts by means of a pin 58. The pin 58 is secured in a collar 59 which is attached to the lower end of the shaft 31, and engages the beveled surface of the cam block 56 to force the plunger in and slides over the block to allow the spring to retrace the plunger.

The finger 53 engages the plate 48 and causes the same to swing into the position shown in dotted lines in Fig. 3, when the plunger is operated, and the plate is returned to the normal position, shown in full lines in the same figure, by gravity.

With the construction, arrangement and coordination of the parts of the feeder shown and described above to illustrate my invention, the operation is substantially as follows:

The corks are dumped indiscriminately into the hopper 11, and the drum 12 and the shaft 41, driving the feed and positioning shafts as described, are rotated. Under the action of the drum the corks are selected and dropped down between the feed shafts, which engage the larger ends of the corks and correct their positions so that the smaller ends of the corks are pointed downwardly. By the rotation of the shaft the corks are fed downwardly in regular order until they pass the shoulders 45 and drop into the receiver 46, from which the corks may be fed into a magazine or supplied for such purposes as desired.

The packer plate 48 is continuously moved back and forth with a swinging movement of the upper end, and, if the corks become disarranged or cocked between the shafts, they are engaged and righted. In case the receiver becomes filled, or the corks are not discharged as fast as they reach the reduced portions of the shafts, clogging is prevented by means of the reciprocating plunger. The plunger in advancing engages the lowermost cork on the shafts, if the cork is held up by the corks in the receiver, or has not dropped down, and moves the cork back into engaging relation with the larger portion of the shafts. The corks are thus retarded and stored on the feed shafts to give the corks in the receiver time to clear if the corks are dropping down out of the hopper faster than they are being removed from the discharge portion of the shafts.

After the plunger is retracted the lowermost cork requires an appreciable amount of time to travel past the shoulder, giving time for the cork in the receiver to drop without any interference. If the receiver remains clogged, the plunger continues pushing the corks back until the space between the shafts and in the sleeve back to the hopper outlet becomes filled and the feeding stops.

The corks are selected and fed evenly and in a uniform position, without clogging or danger of damaging the corks. No complicated construction is required and the machine is simple and reliable in operation.

I claim:

1. In a feeding device for conical corks, a pair of oppositely rotatable shafts mounted in spaced relation so that the shafts engage the larger ends of the corks for vertically positioning the same, means for placing the corks between the shafts, said shafts having an ejecting portion, a receiver associated with said ejecting portion, and reciprocating means for moving the corks back onto the shafts at said ejecting portion when the receiver becomes filled.

2. In a feeding device for conical corks, a pair of shafts mounted in spaced relation so that the shafts engage the larger ends of corks placed therebetween, said shafts having an ejecting portion, means for rotating one of the shafts to move the corks along to said portion, and means for shoving the corks back at the ejecting portion if the corks have not been ejected.

3. In a conical cork feeding device, a pair of shafts mounted in spaced relation to engage the larger ends of the corks, said shafts having an ejecting portion, means or depositing the corks between the shafts, and reciprocating means for shoving the corks back at said ejecting portions if the corks have not been ejected.

4. In a conical cork feeding device, a pair of inclined shafts mounted in spaced relation to engage the larger ends of the corks, means for placing the corks between the shafts, said shafts having a discharging portion, means for rotating the shafts to cause the corks to move therealong, means associated with said discharging portion for shoving the corks back on the shafts if the corks have not been discharged.

5. In a conical cork feeding device, a pair of inclined shafts mounted in spaced relation to engage the larger ends of the corks, means for rotating the shafts to cause the corks to move therealong, and a packer mounted above the shafts to prevent the corks from becoming disarranged and means for continuously raising and lowering the packer.

6. In a feeder for conical objects, a pair of inclined shafts mounted side by side, the shafts being spaced to engage the larger ends of the objects to right the same when placed between the shafts, the shafts being rotated upwardly into contact with the objects, to cause the same to move downwardly along the shafts in a regular manner, and reciprocating means for intermittently retarding the movement of the objects at the lower ends of the shafts.

7. In a cork feeder, a pair of inclined shafts mounted side by side, the shafts being spaced to engage the larger ends of the corks, means for dropping the corks into the space between the shafts, means for rotating the shafts upwardly in contact with the corks to feed the same along the shafts, a receiver mounted underneath the shafts, the shafts being reduced to allow the corks to drop into the receiver, and a reciprocating plunger for moving the lowermost cork back into relation with the unreduced portions of the shafts to prevent clogging when the receiver becomes filled.

8. In combination in a conical cork feeder, a pair of inclined shafts spaced to engage the larger ends of the corks and rotated upwardly in contact with the corks to feed the same along the shafts, the shafts being reduced at one portion to allow the corks to drop through, and a reciprocating finger between the shafts below said reduced portions for moving the lowermost cork back between the shafts to prevent clogging if the cork has not been discharged.

9. In combination in a conical cork feeder, a pair of inclined shafts spaced to engage the larger ends of the corks and rotated upwardly into contact with the corks to feed the same along the shafts, means for dropping the corks into the space between the shafts, a plate movably mounted over the space between the shafts to engage the corks if they become disarranged, and means for continuously raising and lowering the plate.

10. In combination in a cork feeder, a pair of inclined shafts spaced to engage the larger ends of the corks and rotated upwardly into contact with the corks to feed the same along the shafts, the shafts being reduced at their lower portions to allow the corks to drop through, a plunger slidably mounted between the shafts below said reduced portions, and means operated by one of said shafts for intermittently advancing the plunger to engage the lowermost cork.

11. A cork feeder comprising a frame, a pair of shafts rotatably mounted in the frame in an inclined position and spaced to catch the larger ends of the corks, a hopper for the corks mounted on the frame, means for selecting the corks individually and dropping them into the space between the shafts, means for rotating the shafts to move the corks longitudinally therealong, a tube mounted in the frame underneath the shafts, the shafts being reduced to allow the corks to drop into the tube, a plunger slidably mounted in the frame between the shafts and below the reduced portions thereof, a plate swingingly mounted over the shafts to engage the corks and resting in contact with the plunger, and means for reciprocating the plunger.

Signed at Chicago this 22nd day of May, 1928.

ARTHUR I. RISSER.